US008593793B2

(12) United States Patent
Gandhi

(10) Patent No.: US 8,593,793 B2
(45) Date of Patent: Nov. 26, 2013

(54) MULTI-PORTION HOUSING OF A PORTABLE TERMINAL HAVING A CENTRAL PORTION

(75) Inventor: Dinesh Gandhi, Brampton (CA)

(73) Assignee: Psion, Inc., Mississauga (CA)

(*) Notice: Subject to any disclaimer, the term of this patent is extended or adjusted under 35 U.S.C. 154(b) by 132 days.

(21) Appl. No.: 12/659,141

(22) Filed: Feb. 26, 2010

(65) Prior Publication Data

US 2011/0211296 A1 Sep. 1, 2011

(51) Int. Cl.
*H05K 5/00* (2006.01)
*H04M 1/00* (2006.01)

(52) U.S. Cl.
USPC ............ 361/679.01; 361/679.03; 361/679.26; 361/679.3; 455/575.1

(58) Field of Classification Search
USPC ............. 361/679.01, 679.02, 679.08, 679.09, 361/679.3, 679.55–679.59; 345/156, 157, 345/168, 169, 184; 455/575.1, 575.3, 455/575.4, 575.8
See application file for complete search history.

(56) References Cited

U.S. PATENT DOCUMENTS

| | | | | |
|---|---|---|---|---|
| 5,747,786 | A * | 5/1998 | Cargin et al. | ............ 235/462.46 |
| 2010/0019044 | A1* | 1/2010 | Mangaroo et al. | ....... 235/462.47 |
| 2010/0112949 | A1* | 5/2010 | Kim et al. | .................... 455/41.3 |
| 2011/0261548 | A1 | 10/2011 | Gandhi | |

OTHER PUBLICATIONS

Final Office action mailed on Aug. 3, 2012 in U.S. Appl. No. 12/765,923, Dinesh Gandhi, filed Apr. 23, 2010.
Non Final Office action mailed on Mar. 28, 2012 in U.S. Appl. No. 12/765,923, Dinesh Gandhi, filed Apr. 23, 2010.

* cited by examiner

*Primary Examiner* — Robert J Hoffberg
*Assistant Examiner* — Jerry Wu
(74) *Attorney, Agent, or Firm* — Randi L. Karpinia; Michael J. Giannetta

(57) ABSTRACT

A multi-portion housing for a portable terminal having a proximal end, a distal end, a bottom surface, and a top surface, the top surface configured for mounting a user interface between the proximal and distal ends. The multi-portion housing comprises a central housing portion providing a rigid body extending between the proximal and distal ends for facilitating rigidity of the multi-portion housing to inhibit deformation of the multi-portion housing, the central housing portion having an upper surface and an opposing lower surface. A second housing portion is secured to the central housing portion and has a first resilient seal positioned between a first mating surface of the second housing portion and a corresponding mating surface of the central housing portion, the corresponding mating surface of the central housing portion extending only partway between the proximal and distal ends and being positioned on either the upper or the lower surface. A third housing portion (e.g. an endcap) is secured to the second housing portion and has a second resilient seal positioned between a second mating surface of the second housing portion and a corresponding mating surface of the third housing portion. The first resilient seal and the second resilient seal are configured for inhibiting penetration of foreign contaminants into an interior of the multi-portion housing.

23 Claims, 8 Drawing Sheets

MULTI-PORTION HOUSING OF A PORTABLE TERMINAL HAVING A CENTRAL PORTION

FIELD OF THE INVENTION

This invention relates to a housing of a portable terminal.

BACKGROUND

As consumers increasingly rely on their mobile terminals, they desire to take their mobile terminals everywhere they go and have access to them at any time of day. As a result, today's mobile devices are frequently used in environments hostile to the mobile terminal's electronics. For example, a person who takes a cell phone, PDA, or similar device, to the beach risks harming the device by getting the device sandy or wet. Likewise, someone who works outdoors and is exposed to the elements may desire to have a mobile terminal that is water, dirt, and shock resistant. Accordingly, the sealing feature of a display of the mobile device and the device housing is important for the continued operational integrity of the device in the presence of hostile environments with undesirable foreign matter (e.g. water, other fluids, moisture, particulate matter, etc.).

Further, today's handheld terminals have increasing needs for adaptability for providing an ever increasing degree of user functionality. In certain user requirements, housing reconfiguration potential is desired to flexibly adapt the handheld terminal to the changing user requirements while at the same time providing for durability of the housing to help protect the interior components of the handheld from shocks/impacts experienced by the housing. Accordingly, current handheld housings may not allow for easy removal (e.g., for replacement, repair, cleaning, alternative configuration of the terminal capabilities/functionality of the housed components), in particular for the optimum positioning of one or more antennas installed in the housing of the handheld terminal.

SUMMARY

It is an object of the present invention to provide a portable terminal housing for addressing at least one of the above presented disadvantages.

Today's handheld terminals have increasing needs for adaptability for providing an ever increasing degree of user functionality. In certain user requirements, housing reconfiguration potential is desired to flexibly adapt the handheld terminal to the changing user requirements while at the same time providing for durability of the housing to help protect the interior components of the handheld from shocks/impacts experienced by the housing. Accordingly, current handheld housings may not allow for easy removal (e.g., for replacement, repair, cleaning, alternative configuration of the terminal capabilities/functionality of the housed components), in particular for the optimum positioning of one or more antennas installed in the housing of the handheld terminal. Contrary to other portable terminals there is provided a multi-portion housing for a portable terminal having a proximal end, a distal end, a bottom surface, and a top surface, the top surface configured for mounting a user interface between the proximal and distal ends. The multi-portion housing comprises a central housing portion providing a rigid body extending between the proximal and distal ends for facilitating rigidity of the multi-portion housing to inhibit deformation of the multi-portion housing, the central housing portion having an upper surface and an opposing lower surface. A second housing portion is secured to the central housing portion and has a first resilient seal positioned between a first mating surface of the second housing portion and a corresponding mating surface of the central housing portion, the corresponding mating surface of the central housing portion extending only partway between the proximal and distal ends and being positioned on either the upper or the lower surface. A third housing portion (e.g. an endcap) is secured to the second housing portion and has a second resilient seal positioned between a second mating surface of the second housing portion and a corresponding mating surface of the third housing portion. The first resilient seal and the second resilient seal are configured for inhibiting penetration of foreign contaminants into an interior of the multi-portion housing.

An aspect provided is a multi-portion housing for a portable terminal having a proximal end, a distal end, a bottom surface, and a top surface, the top surface configured for mounting a user interface between the proximal and distal ends, the multi-portion housing comprising: a central housing portion providing a rigid body extending between the proximal and distal ends for facilitating rigidity of the multi-portion housing to inhibit deformation of the multi-portion housing, the central housing portion having an upper surface and an opposing lower surface; a second housing portion secured to the central housing portion and having a first resilient seal positioned between a first mating surface of the second housing portion and a corresponding mating surface of the central housing portion, the corresponding mating surface of the central housing portion extending only partway between the proximal and distal ends and being positioned on either the upper or the lower surface; and a third housing portion secured to the second housing portion and having a second resilient seal positioned between a second mating surface of the second housing portion and a corresponding mating surface of the third housing portion; wherein the first resilient seal and the second resilient seal are configured for inhibiting penetration of foreign contaminants into an interior of the multi-portion housing.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Portable Terminal 10

Figure 1:
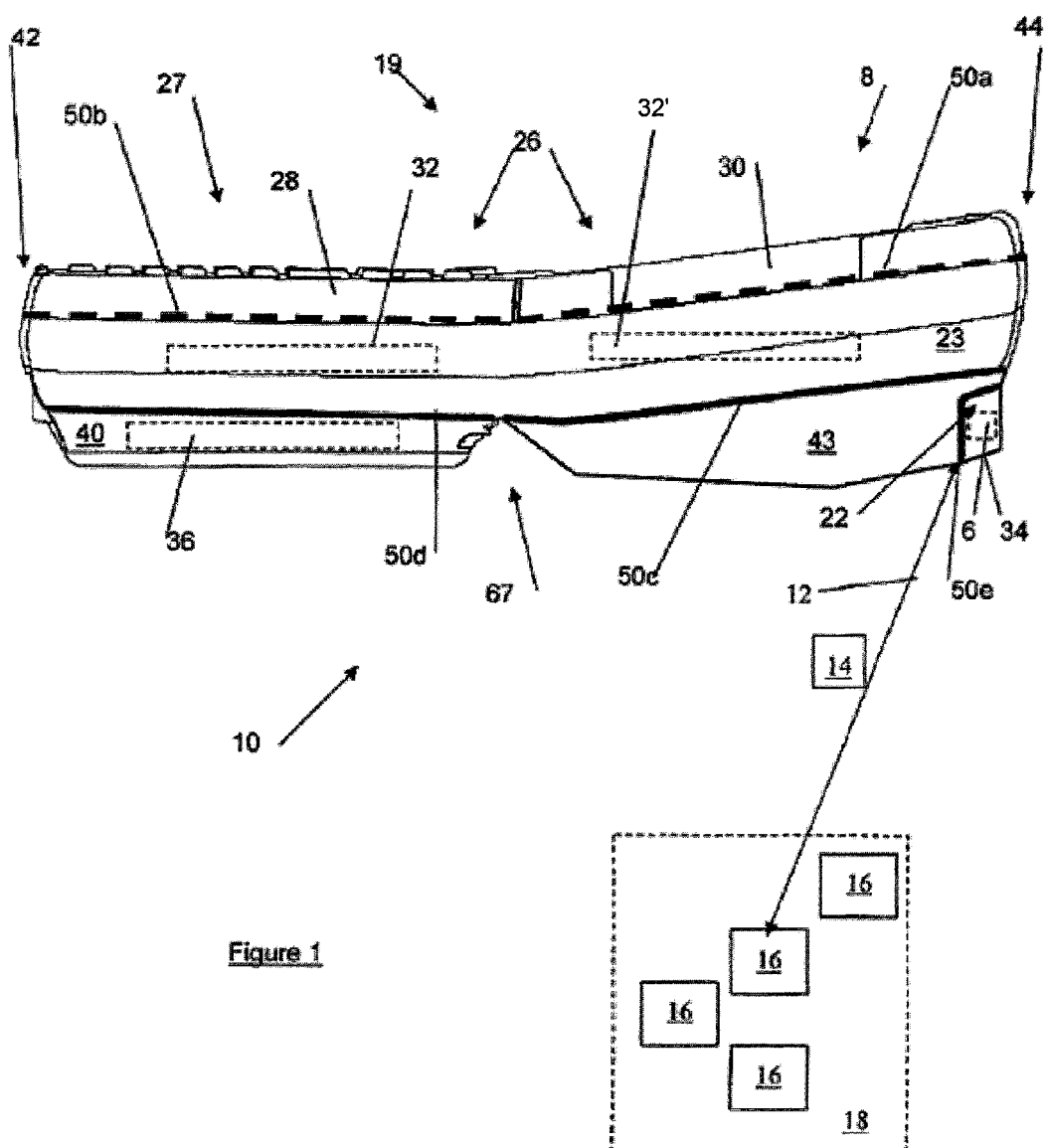
FIG. 1 is a side view of components in a multi-component housing of a portable terminal for interaction with a logistics environment.

Referring to FIG. 1, shown is a portable terminal 10 for providing imaging and/or scanning features (and/or functions), in data capture/communications via signals 12, and asset tracking/management, for example in wireless communication 14 with tracking (e.g. information) objects 16 (e.g. barcode labels and/or RFID tags) present in one or more logistics environments 18 (e.g. industrial, retail, supply chain). It is recognised that the tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking. It is also recognised that the portable terminal 10 can be configured for communications 12 with other portable terminals 10 as desired.

The portable terminal 10 has a multi-portion housing 8 comprising a central housing portion 23, a secondary housing portion 43, a battery cover 40, and a third housing portion 34. The multi-portion housing 8 is configured such that the third housing portion 34 is coupled to the housing 8 via the second housing portion 43, as further described below. It is recognised that in the description, the terms "housing" and "enclosure" can be used interchangeably. Also, the housing 8 can include a battery cover 40 for housing a battery 36 or other power source for providing operational power to one or more components 19 of the portable terminal 10.

Figure 2:
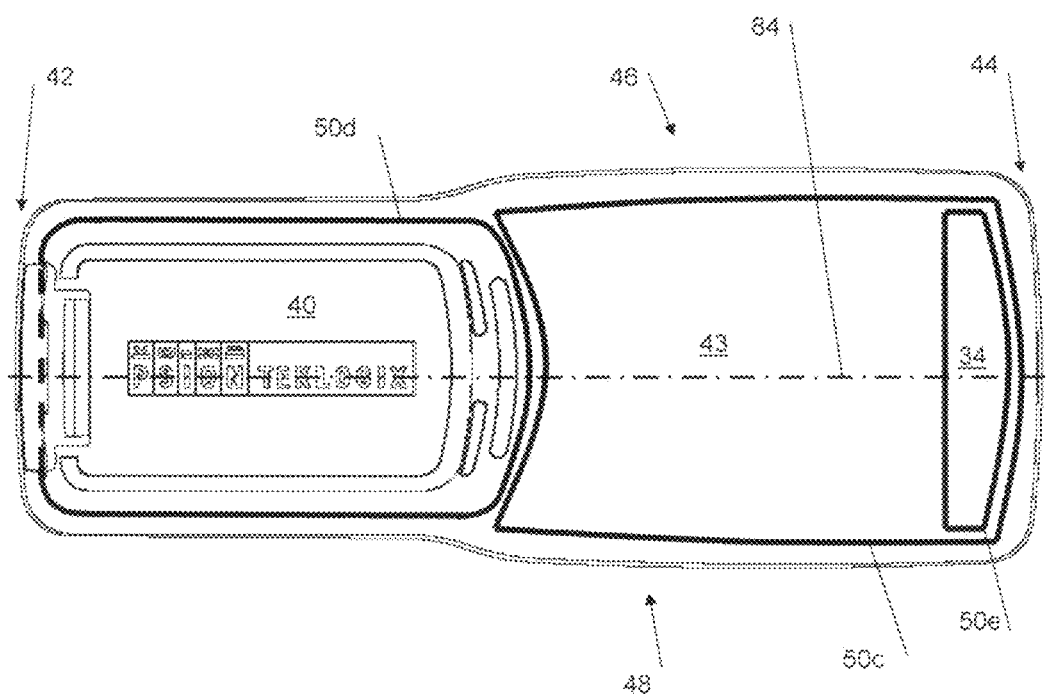
FIG. 2 is a bottom view of the portable terminal of FIG. 1.

Various example embodiments of the central housing portion 23 can be configurations such as but not limited to: the rigid body is composed of an integral rigid plastic body extending between the proximal 42 and distal 44 ends; the rigid body is composed of a plastic body reinforced by one or more stiffening members (not shown) attached to the plastic body; and the rigid body is composed of a plurality of plastic components/segments rigidly connected to one another by mechanical and/or mechanical fastening means. The multi-portion housing 8 rigidity can be selected from the group comprising: torsional rigidity about the longitudinal axis 84 (see FIG. 2) extending between the proximal 42 and distal 44 ends and bending rigidity about the longitudinal axis 84 extending between the proximal 42 and distal 44 ends.

Further, the exterior dimensions of the multi-portion housing 8 can be ergonomically designed to be comfortable for operation by many different users having different sized hands. As such, the known housings can provide a non-contoured/ergonomic grip configuration, which tends to make such known housings uncomfortable to use (e.g. premature fatigue felt by the hand of the user). Further, different assembly processes for the various components into the housing of the device need approximately configured sealing components that are compatible with the assembly processes and configuration of the housing.

The portable terminal 10 has a number of components 19 including a user interface 26 located on a front surface 27, including a keyboard 28 and/or a display 30 (e.g. touch screen) for example, one or more onboard processors 32 (e.g. shown by ghosted lines as inside of the enclosure 23), and a scanner/radio communications module 32' (e.g. laser, WLAN with VoIP and Bluetooth, imager, RFID scanner, etc.—inside of the enclosure 23) coupled to an antenna 6 for facilitating wireless communication 14 and/or data capture 12. The radio module 32' and/or the antenna 6 can be mounted in the central housing 23, in the secondary housing 43, and/or in an interior 22 of the third housing 34. The onboard power source 36 can be located on a back surface 67 for helping to satisfy power requirements of the onboard processor(s) 32, the user interface 26, and optionally the communication module 32. Further, the housing has a proximal end 42, a distal end 44, and a first side 46 and a second side 48 extending between the ends 42, 44.

Components 19

Referring to FIG. 1, the electrical components of the portable terminal 10 can be components such as but not limited to: a main logic board (MLB) 32 or other printed circuit board(s) (PCB); radio modules 32' such as receivers/transmitters/transceivers for coupling to the antenna 6; UI devices 26 (e.g. keypad 28, display 30) and memory devices. For example, the MLB is the central printed circuit board (PCB) that, like a backplane, provides the electrical connections by which the other electrical components of the portable terminal 10 communicate and hosts the central processing unit and other subsystems housed in the central housing portion 23. The MLB can also contain a chipset which forms an interface between the CPU's front-side bus, main memory, and peripheral buses, non-volatile memory chips (usually Flash ROM in modern motherboards) containing the portable terminals 10 firmware or BIOS, a clock generator which produces the system clock signal to synchronize the various components, and/or slots for expansion ports that can be interfaced via the buses supported by the chipset.

The radio receiver/transmitter/transceiver 32' is one of the electrical components that is connected to the antenna 6 via a feed line (not shown). The radio receiver/transmitter/transceiver 32' is an electronic circuit that receives and/or transmits its input/output from/to the antenna 6 via the feed line, uses electronic filters to separate any wanted radio signals 12 from all other signals 12 picked up by the antenna 6, amplifies the signals 12 to a level suitable for further processing, and finally converts through demodulation and decoding the signal into a form usable for the user of the portable terminal 10, such as sound (e.g. voice), pictures, digital data, measurement values, and/or navigational positions (e.g. GPS values) provided on the user interface 26.

Figure 7:
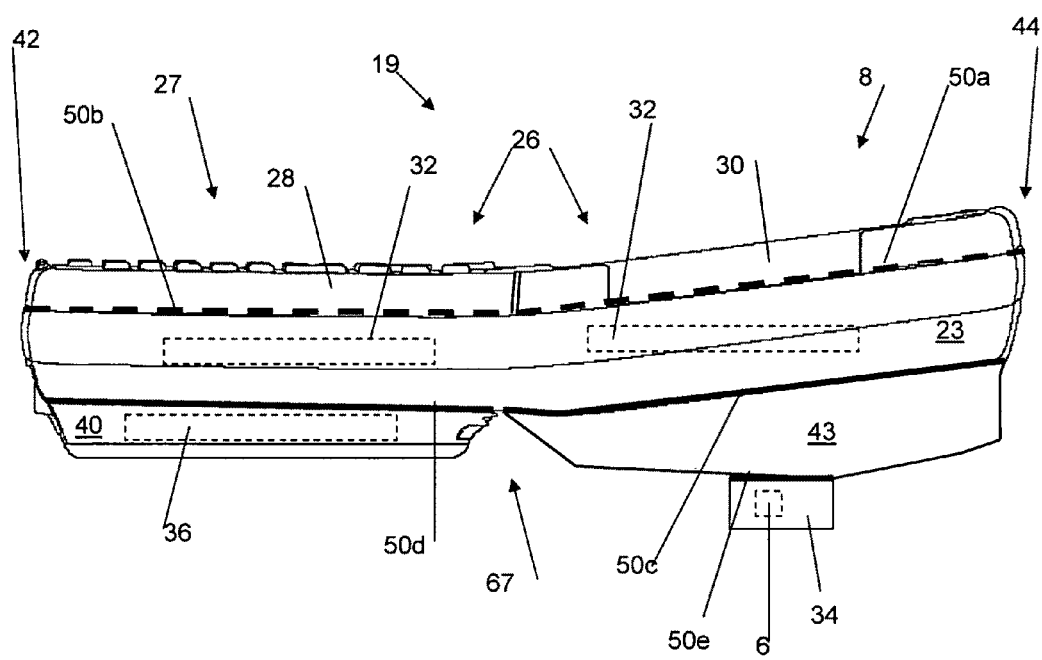
FIG. 7 is a still further embodiment of the third housing of FIG. 1.
Figure 8:
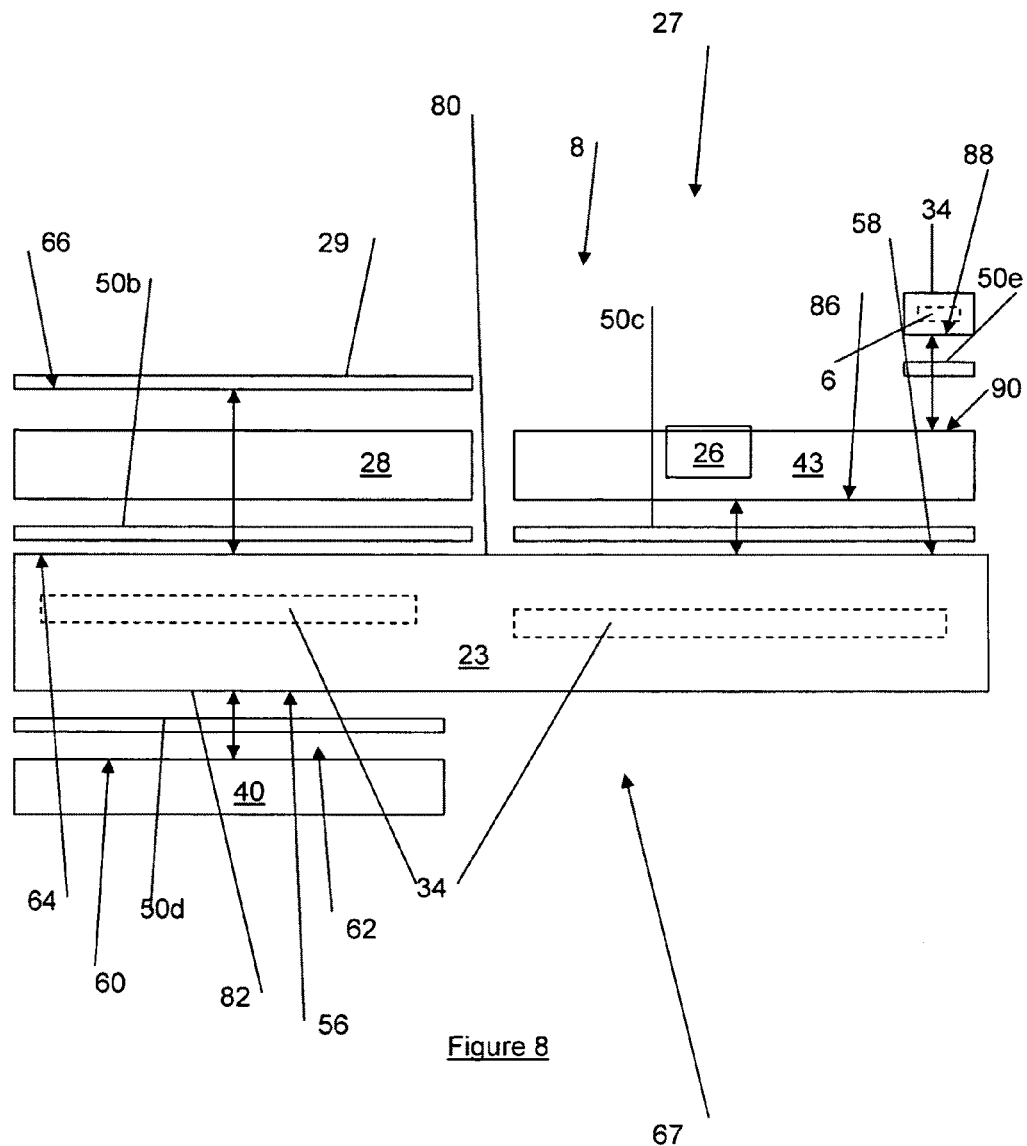
FIG. 8 is an alternative embodiment of multi-component housing of FIG. 5.

Referring to FIG. 1, the antenna 6 can have a physical form factor to make it possible to embed (i.e. into the interior of the housing 8). The handheld terminal 10 can have the antenna 6 coupled via the feed line to the battery 36 and a transceiver 32' (for example as a transmitter only for transmitting, a receiver only for receiving or combined as the transceiver for both transmission and reception of the signals 12), which are housed at least partially in the central housing portion 23 of the handheld 10 (e.g. in the housing portion 23 also containing the display 30 and/or keyboard 28). For example, the third housing portion 34 can be positioned on the distal end 44 of the handheld 10 as an endcap adjacent to the display 30 and/or the keypad 28. It is also recognised that the third housing portion 34 can be positioned on a backside (see FIG. 7) of the second housing portion 43 opposite the display 30 and/or the keypad 28. The third housing portion 34 has an interior 22 having one or more mounts for mounting the antenna 6 in the interior 22. It is recognised that the antenna 6 can be configured to function as a WAN, WIFI and/or Bluetooth communication technologies antenna 6 (e.g. non-directional based antennas), and/or as a directional antenna 6 (e.g. RFID scanner).

The portable terminal 8 has the enclosure/housing 23 having the first interior 31 for housing (completely or at least partially within) a plurality of electronic components (e.g. components 32, 28, 30) and a secondary enclosure 43 (coupled to the primary enclosure 23) for housing the antenna 6 or other components 19 that do not fit inside of the interior 31 of the central housing portion 23. It is recognised that the antenna 6 can be completely enclosed (e.g. an internal antenna 6) in the interior of the secondary enclosure 43 or can be partially enclosed in the interior, as desired. Further, it is recognised that the third enclosure 34 has the interior 22 for housing (completely or at least partially within) a plurality of electronic components (e.g. components 32, 6) or other components 19 that do not fit inside of the interior 31 of the central housing portion 23. It is recognised that the antenna 6 can be completely enclosed (e.g. an internal antenna 6) in the interior of the third enclosure 34 or can be partially enclosed in the interior 22, as desired.

Multi-Portion Housing 8

Figure 4:
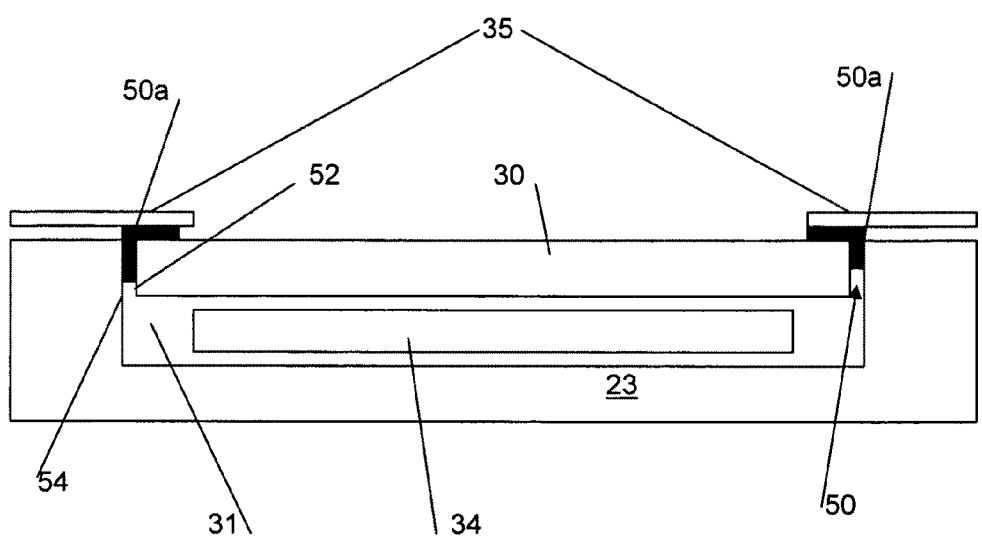
FIG. 4 shows a cross sectional A-A view of the terminal of FIG. 3.
Figure 5:
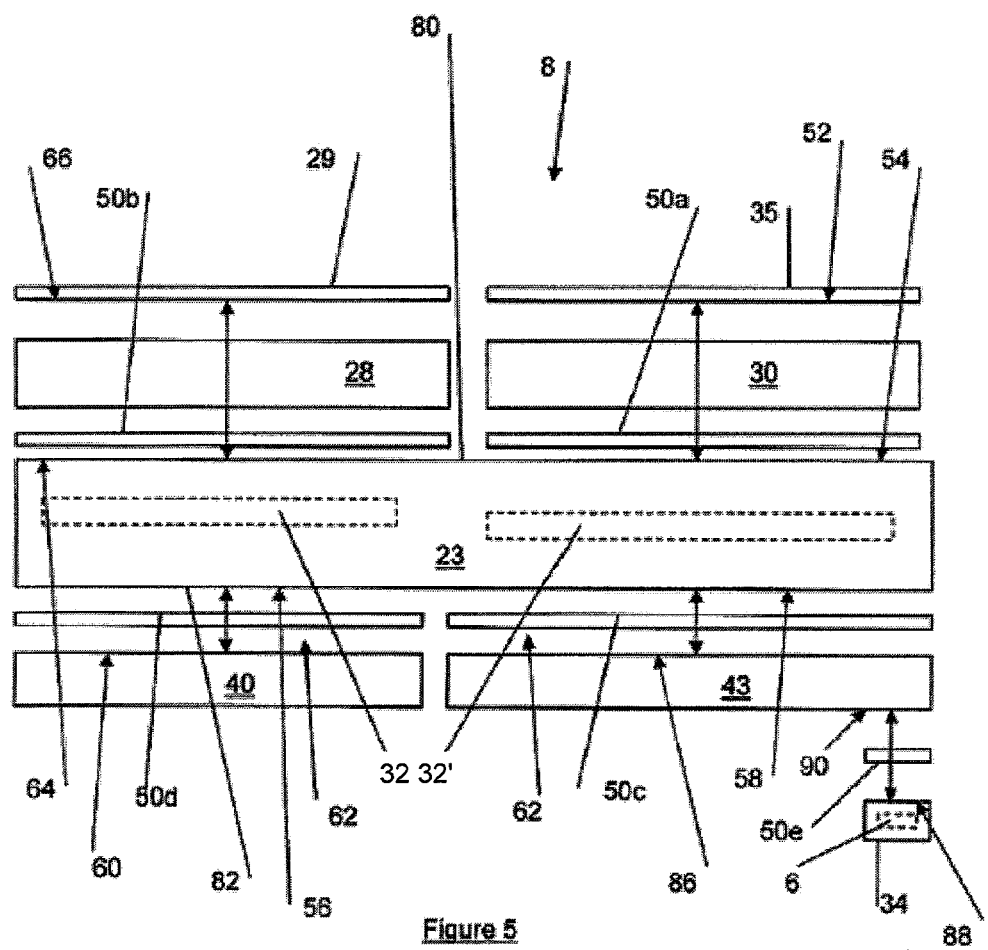
FIG. 5 is a block diagram of an example embodiment of the multi-component housing of FIG. 1.

Referring to FIG. 5, shown is an exploded view of the multi-portion housing 8 of the portable terminal 10. It is recognised that the multi-portion housing 8 has a central housing 23 that is configured to house the user interface 26 (e.g. keypad 28 and/or display 30) accessed by the terminal user by the front/top surface 27 of the terminal 10, such that at least a portion of the user interface 26 is housed within an interior of the central housing 23. The user interface 26 is associated with one or more seals 50a, 50b for inhibiting potential penetration of contaminant material (moisture, dirt, etc.) from the environment 18 into the interior 31 of the central enclosure 23 (see FIG. 4), via the interface region 50 (see FIG. 4) between the central housing 23 and the user interface 26 (e.g. display 30) mounted into the interior 31. The seal(s) 50a,b is/are positioned between a mating surface 52 of the user interface 26 and a corresponding mating surface 54 of the central housing 23 (and about a periphery of the mating surfaces 52,54), such that the seals 50a,b can be provided as a resilient gasket sandwiched between the mating surfaces 52,54 and either separate to or attached to the mating surfaces 52,54 (e.g. a resilient material formed or otherwise adhered to at least one of the mating surfaces 52,54). In the example shown, the mating surface 54 of the central housing 23 is in the interior 31, however, it is also recognised that the mating surface 54 can be on the front surface 27 (i.e. external surface of the central housing 23), as desired. The optional positioning of the seals 50a,b in the interior 31 of the central housing portion 23 is represented by the ghosted lines 50a,b, by example only.

Figure 3:
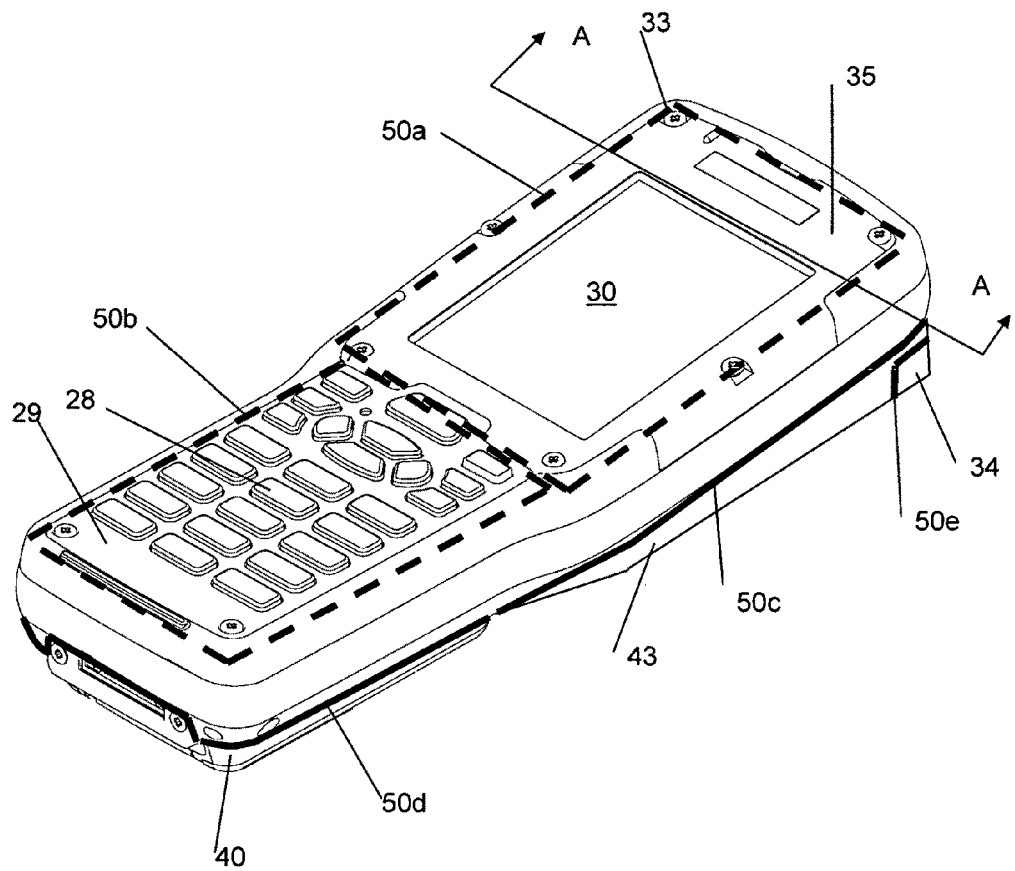
FIG. 3 is a proximal end view of the terminal of FIG. 1.

For example, the display 30 is coupled to the central enclosure 23 by a cover plate 35 connected (e.g. releasable) via a plurality of fasteners 33 (e.g. screws, snaps, rivets, adhesive or other fastening means as apparent to one skilled in the art), see FIG. 3 The display 30 is situated between the seal component 50a (e.g. a gasket) and a compartment in the interior 31 of the central enclosure 23 (see FIG. 4), such that the ingress of foreign matter (e.g. water, moisture, particulate matter, etc.) around the display 30 and into the interior 31 via the interface region 50 is inhibited by the seal component 50a.

For example, the keypad 28 is coupled to the central enclosure 23 by a cover plate 29 connected (e.g. releasable) via a plurality of fasteners 33 (e.g. screws, snaps, rivets, adhesive or other fastening means as apparent to one skilled in the art). The keypad 28 is situated between the seal component 50b (e.g. a gasket) and a compartment in the interior 31 of the central enclosure 23, such that the ingress of foreign matter (e.g. water, moisture, particulate matter, etc.) around the keypad 28 and into the interior 31 via the interface region is inhibited by the seal component 50b, positioned between a mating surface 66 of the cover plate 29 and/or keypad 28 itself and a corresponding mating surface 64 (inside the interior 31 and/or positioned on the front surface 27, as desired) of the central enclosure 23, see FIG. 5.

Referring again to FIG. 5, the central housing 23 extends from the proximal end 42 to the distal end 44 of the multi-portion housing 8 to act as a rigid or otherwise stiff spine or backbone of the multi-portion housing 8. The purpose of the central housing 23 is to provide resistance to impacts and/or other external forces (e.g. bending, torsional, etc. about a longitudinal axis 84 of the multi-portion housing 8—see FIG. 2) applied to or otherwise experienced by the multi-portion housing 8 of the portable terminal 10 during use by the user (e.g. in the event of hitting or otherwise dropping the portable terminal 10). The material of the central housing 23 can be composed of rigid plastic, metal, composite material, or a combination thereof, to impart the desired resistance to deformation of the central housing 23 due to external force(s) when applied to one or more portions (including the central enclosure 23) of the multi-portion housing 8. For example, the external force(s) can be experienced directly by the central enclosure 23 and/or indirectly via impact(s) experienced by the other attached portions (e.g. cover 40, back cover 43, end cap 34) of the multi-portion housing 8.

The central housing 23 also has a plurality of mating surfaces 56,58 configured for mating with the other enclosure portions of the multi-portion housing 8, such as the battery cover portion 40 and the back/second cover portion 43.

For example, the power source 36 (e.g. battery) is retained by the central enclosure 23 for use by the other components 19 (e.g. display 30, keypad 28, processor 32, radio modules 34, etc.) via the cover 40 that is coupled/attached to the enclosure 23 on the back/bottom surface 67, as either removable or as an integral part of the central enclosure 23. In the case of the cover 40 being removable from the central enclosure 23, the seal 50d is positioned between a mating surface 60 of the cover 40 and the corresponding mating surface 56 of the central enclosure 23 (e.g. positioned on the back surface 67). The seal 50d is configured for inhibiting potential penetration of contaminant material (moisture, dirt, etc.) from the environment 18 into the interior of the housing 8, via the interface region 62 between the central housing 23 and the cover 40 mounted on the back surface 67. The seal 50d is positioned between the mating surface 60 of the cover 40 and the corresponding mating surface 56 of the central housing 23, such that the seal 50d can be provided as a resilient gasket sandwiched between the mating surfaces 56,60 (and about a periphery of the mating surfaces 56,60) and either separate to or attached to one of the mating surfaces 56,60 (e.g. a resilient material formed or otherwise adhered to at least one of the mating surfaces 56,60).

The secondary housing portion 43 is coupled/attached to the enclosure 23 on the back/bottom surface 67 (e.g. as removable) of the central enclosure 23. In the case of the housing portion 43 being removable from the central enclosure 23, the seal 50c is positioned between a mating surface 86 of the housing portion 43 and the corresponding mating surface 58 of the central enclosure 23 (e.g. positioned on the back surface 67). The seal 50c is configured for inhibiting potential penetration of contaminant material (moisture, dirt, etc.) from the environment 18 into the interior of the housing 8, via the interface region 62 between the central housing 23 and the housing portion 43 mounted on the back surface 67. The seal 50c is positioned between the mating surface 86 of the housing portion 43 and the corresponding mating surface 58 of the central housing 23, such that the seal 50c can be provided as a resilient gasket sandwiched between the mating surfaces 86,58 (and about a periphery of the mating surfaces 86,58) and either separate to or attached to one of the mating surfaces 86,58 (e.g. a resilient material formed or otherwise adhered to at least one of the mating surfaces 86,58).

The third housing portion 34 is coupled/attached to the second housing 43 on the (e.g. as removable). In the case of the housing portion 34 being removable from the housing portion 43, the seal 50e is positioned between a mating surface 90 of the housing portion 43 and the corresponding mating surface 88 of the third housing portion 34. The seal 50e is configured for inhibiting potential penetration of contaminant material (moisture, dirt, etc.) from the environment 18 into the interior of the housing 8, via the interface region between the housing portions 34, 43 mounted on the back surface 67. The seal 50e is positioned between the mating surface 88 of the housing portion 43 and the corresponding mating surface 90 of the second housing 43, such that the seal 50e can be provided as a resilient gasket sandwiched between the mating surfaces 88,90 (and about a periphery of the mating surfaces 88,90) and either separate to or attached to one of the mating surfaces 88,90 (e.g. a resilient material formed or otherwise adhered to at least one of the mating surfaces 88,90).

One of the reasons for the central housing portion 23, the secondary housing portion 43, and optionally the third housing portion 34 is modularity, as portions of the housing 8. Customers have the potential to remove a pod (third housing portion 34) or endcap (third housing portion 34) and replace it with another version having of same having different interior spacing and/or internal mounting configurations for different respective terminal modules that are appropriate to new/expanded particular functionality of the terminal 10 as desired by the customer/user of the terminal 10. For example, if a customer has a laser barcode scanner and they wish to replace it with a imager scanner, they could undo the attachment mechanism between the housing portions 23,43,34 (e.g. four screws) and replace the appropriate endcap 43 or likewise for the pod 43, and/or likewise for the cover 34. So, the customer can view the endcap 43 and the pod 43 and the cover 34 as modules which can be replaced/exchanged easily with respect to the central portion 23. Accordingly, functionality of the terminal 10 can be modified (e.g. expanded, changed) by exchanging/adding the appropriate secondary 34 and/or third housing 43 portions on the common central portion 23.

Seal 50a,b,c,d,e

The seal component 50a,b,c,d,e is made of a resilient material for facilitating a compression of the sealing component between the appropriate mating surfaces of: the central housing portion 23 and the secondary housing portion 43; the secondary housing portion 43 and the third housing portion 34; and between the battery cover 40 and the central housing portion 23. The material of the seal component 50a,b,c,d,e is made of resiliently flexible material, such as but not limited to: rubber; a rubber derivative; an elastomeric material; and other suitable polymers as would be apparent to one skilled in the art, for facilitating the seal between mating housing 8 portions for inhibiting the penetration of foreign contaminant material from the logistics environment 18 into the interior of the multi-portion housing 8 of the portable terminal 10 (i.e. in the interior of the central housing portion 23, in the interior of the secondary housing portion 43, in the interior of the third housing portion 34 (e.g. endcap), and/or in the interior of the battery cover 40 covering a battery compartment for the battery 36.

Accordingly, in view of the above, the multi-portion housing 8 for the portable terminal 10 has the proximal end 42, the distal end 44, a bottom surface 67, and the top surface 27, the top surface 27 configured for mounting the user interface 26 between the proximal 42 and distal ends 44. The multi-portion housing 8 comprises: the central housing portion 23 providing a rigid body extending between the proximal 42 and distal 44 ends for facilitating rigidity of the multi-portion housing 8 to inhibit deformation of the multi-portion housing 8, the central housing portion 23 having an upper surface 80 and an opposing lower surface 82 (see FIG. 5). The second housing portion 43 is secured (e.g. releasably via mechanical fasteners such as screws, clips, etc.) to the central housing portion 23 and has the first resilient seal 50c positioned between a first mating surface 86 of the second housing portion 43 and a corresponding mating surface 58 of the central housing portion 23, the corresponding mating surface 58 of the central housing portion 23 extending only partway between the proximal 42 and distal 44 ends and being positioned on either the upper 80 or the lower 82 surface. The third housing portion 34 is secured (e.g. releasably via mechanical fasteners such as screws, clips, etc.) to the second housing portion 43 and having a second resilient seal 50e positioned between a second mating surface 90 of the second housing portion 43 and a corresponding mating surface 88 of the third housing portion 34. The first resilient seal 50c and the second resilient seal 50e are configured for inhibiting penetration of foreign contaminants into the interior of the multi-portion housing 8.

Figure 6:
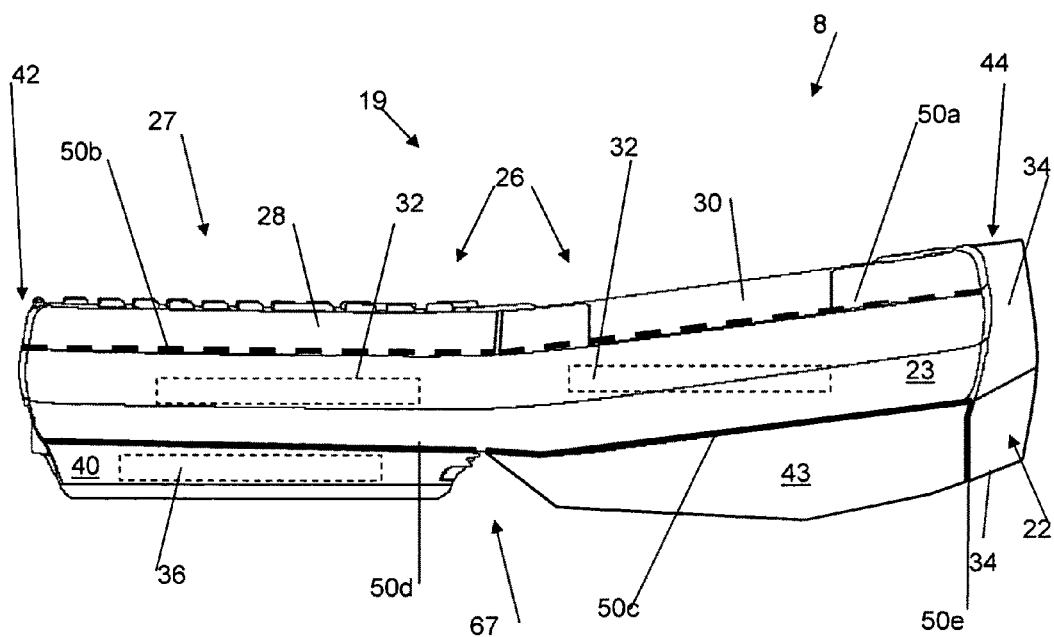
FIG. 6 is a further embodiment of the third housing of FIG. 1.

Further to the above, referring again to FIGS. 1,2,3,4,5, the corresponding mating surface 58 of the central housing portion 23 is positioned on the lower surface 82. At least a portion of the upper surface 80 provides the top surface 27 for the user interface 26 (e.g. for mounting the keypad 28). The second mating surface 90 of the second housing portion 43 can be positioned adjacent to the distal end 44. Further, at least a portion of the user interface 26 can be positioned in an interior of the central housing portion 23 and away from the distal end 44. The multi-portion housing 8 can include a mounting in the interior 22 of the third housing portion 34 for mounting at least one of an antenna 6 or a radio module 32 coupled to the antenna 6 configured for providing information to the user interface 26. The third housing portion 34 can project outwardly from the distal end 44 of the central housing portion 23, as shown in FIG. 6. The corresponding mating surface 90 for the third housing portion 34 can be positioned between the proximal 42 and distal 44 ends. The corresponding mating surface 90 for the third housing portion can be positioned at the distal end 44.

Further, the multi-portion housing 8 can include a fourth housing portion 34 secured to the second housing portion 43 and having a third resilient seal 50e positioned between a third mating surface 90 of the second housing portion 43 and a corresponding mating surface 88 of the fourth housing portion 34, the third mating surface 88 located away from the distal end 44.

Alternative Embodiment of the Multi-Portion Housing 8

Referring to FIGS. 1,6,7,8, an alternative embodiment of the multi-portion housing 8 is such that the corresponding mating surface 58 of the central housing portion 23 is positioned on the upper surface 80 and at least a portion of the top surface 27 is provided by the second housing portion 43. Further, the corresponding mating surface 58 of the central housing portion 23 is positioned on the upper surface 80 of the central housing portion 23 and at least a portion of the top surface 27 is provided by the central housing portion 23. Further, the corresponding mating surface 58 of the central housing portion 23 is positioned adjacent to the distal end 44. It is also recognised that at least a portion of the user interface 26 can be positioned in an interior of the second housing portion 43 and away from the second mating surface 90 used to couple the third housing portion 34 to the multi-portion housing 8.

I claim:

1. A multi-portion housing for a portable terminal having a proximal end, a distal end, a bottom surface, and a top surface, the top surface configured for mounting a user interface between the proximal and distal ends, the multi-portion housing comprising:
- a central housing portion providing a rigid body extending between the proximal and distal ends for facilitating rigidity of the multi-portion housing to inhibit deformation of the multi-portion housing, the central housing portion having an upper surface and an opposing lower surface;
- a second housing portion comprising a first electronic module removably coupled to the central housing portion and having a first resilient seal positioned between a first mating surface at the outer periphery of the second housing portion and a corresponding mating surface of the central housing portion, the second housing portion being configured to be replaceable with a first different housing portion comprising a second electronic module that is different than the first electronic module; and
- a third housing portion comprising a third electronic module removably coupled to the second housing portion and having a second resilient seal positioned between a second mating surface at the outer periphery of the second housing portion and a corresponding mating surface of the third housing portion, the third housing portion being configured to be replaceable with a second different housing portion comprising a fourth electronic module that is different than the third electronic module;
- wherein the first resilient seal and the second resilient seal are configured for inhibiting penetration of foreign contaminants into an interior of the multi-portion housing.

2. The multi-portion housing of claim 1, wherein the corresponding mating surface of the central housing portion is positioned on the upper surface and at least a portion of the top surface is provided by the second housing portion.

3. The multi-portion housing of claim 1, wherein the corresponding mating surface of the central housing portion is positioned on the upper surface of the central housing portion and at least a portion of the top surface is provided by the central housing portion.

4. The multi-portion housing of claim 2, wherein the corresponding mating surface of the central housing portion is positioned adjacent to the distal end.

5. The multi-portion housing of claim 4, wherein at least a portion of the user interface is positioned in an interior of the second housing portion and away from the second mating surface.

6. The multi-portion housing of claim 5, wherein the at least portion of the user interface is a display.

7. The multi-portion housing of claim 1, wherein the corresponding mating surface of the central housing portion is positioned on the lower surface.

8. The multi-portion housing of claim 7, wherein at least a portion of the upper surface provides the top surface for the user interface.

9. The multi-portion housing of claim 7, wherein the second mating surface of the second housing portion is positioned adjacent to the distal end.

10. The multi-portion housing of claim 4, wherein at least a portion of the user interface is positioned in an interior of the central housing portion and away from the distal end.

11. The multi-portion housing of claim 1 further comprising a mounting in an interior of the third housing portion for mounting at least one of an antenna or a radio module coupled to the antenna configured for providing information to the user interface.

12. The multi-portion housing of claim 11, wherein the third housing portion projects outwardly from the distal end.

13. The multi-portion housing of claim 11, wherein the corresponding mating surface of the third housing portion is positioned between the proximal and distal ends.

14. The multi-portion housing of claim 12, wherein the corresponding mating surface of the third housing portion is positioned at the distal end.

15. The multi-portion housing of claim 11 further comprising a fourth housing portion secured to the second housing portion and having a third resilient seal positioned between a third mating surface of the second housing portion and a corresponding mating surface of the fourth housing portion, the third mating surface located away from the distal end.

16. The multi-portion housing of claim 1 further comprising a fourth housing portion is releasably secured to the second housing portion.

17. The multi-portion housing of claim 1, wherein the rigid body is composed of an integral rigid plastic body extending between the proximal and distal ends.

18. The multi-portion housing of claim 1, wherein the rigid body is composed of a plastic body reinforced by one or more stiffening members attached to the plastic body.

19. The multi-portion housing of claim 1, wherein the rigid body is composed of a plurality of plastic components rigidly connected to one another.

20. The multi-portion housing of claim 1, wherein the rigidity is selected from the group comprising: torsional rigidity about a longitudinal axis extending between the proximal and distal ends and bending rigidity about a longitudinal axis extending between the proximal and distal ends.

21. The multi-portion housing of claim 7 further comprising a battery cover releasably attached to the lower surface adjacent to the second housing portion.

22. The multi-portion housing of claim 21 further comprising the user interface including at least one of a keypad or a touch screen adjacent to the proximal end.

23. A multi-portion housing for a portable terminal, the multi-portion housing comprising:
- a central housing portion extending between proximal and distal ends, the central housing portion having an upper surface and an opposing lower surface;
- a second housing portion comprising a first electronic module, the second housing being removably coupled to the central housing portion and having a first resilient seal positioned between a first mating surface at the outer periphery of the second housing portion and a corresponding mating surface of the central housing portion, the first resilient seal being attached to one of the first mating surface and the corresponding mating surface of the central housing portion, the second housing portion being configured to be replaceable with a first different housing portion comprising a second electronic module that is different than the first electronic module; and
- a third housing portion comprising a third electronic module removably coupled to the second housing portion and having a second resilient seal positioned between a second mating surface at the outer periphery of the second housing portion and a corresponding mating surface of the third housing portion, the second resilient seal being attached to one of the second mating surface and the corresponding mating surface of the third housing portion, the third housing portion being configured to be replaceable with a second different housing portion comprising a fourth electronic module that is different than the third electronic module;

the first resilient seal and the second resilient seal being configured for inhibiting penetration of foreign contaminants into an interior of the multi-portion housing;
each of the first and second different housing portions having different dimensions than the second and third housing portions, respectively.

\* \* \* \* \*